United States Patent [19]

Reppert

[11] 4,019,782
[45] Apr. 26, 1977

[54] AUTOMOTIVE WIRE WHEEL AND MANUFACTURING METHOD

[75] Inventor: Merlyn R. Reppert, Torrance, Calif.

[73] Assignee: W. R. Grace & Co., New York, N.Y.

[22] Filed: May 2, 1975

[21] Appl. No.: 573,870

[52] U.S. Cl. .................................. 301/58; 301/69
[51] Int. Cl.² ........................................ B60B 1/04
[58] Field of Search ............... 301/5 R, 9 R, 95 B,
   301/55, 58, 59, 67–69, 73–75, 79–81, 95–98,
   104, 105 R; 29/159 R, 159.01, 159.02, 159.03

[56] References Cited

UNITED STATES PATENTS

| | | | |
|---|---|---|---|
| 703,029 | 6/1902 | Wilske | 301/104 |
| 1,474,716 | 11/1923 | Hestand | 301/69 |
| 1,507,615 | 9/1924 | Mosier | 301/69 |
| 2,014,751 | 9/1935 | van Ranst | 301/95 B |
| 2,551,783 | 5/1951 | Ash | 301/97 |
| 3,008,770 | 11/1961 | Mueller | 301/58 |

Primary Examiner—Stanley H. Tollberg
Attorney, Agent, or Firm—William Kovensky; William W. McDowell

[57] ABSTRACT

An improved automobile wheel with wire spokes and a novel method for making a spoked wheel. A metal spoked automotive wheel for tubeless tires having an outer circular rim with drop center adapted for receiving a tire is attached to a tubular hub assembly having means for receiving wire spokes. Wire spokes extend radially outward from the hub with terminal threads adapted for mounting a felly with threaded spoke nipples. The improved wheel center includes a narrow concentric inner felly of solid cross-section with holes for receiving the spoke nipples and peripheral portions for engaging the tire rim drop center. The felly has spaced-apart radial nipple-receiving holes and is integrally joined to the drop center of the rim at the flange.

13 Claims, 4 Drawing Figures

AUTOMOTIVE WIRE WHEEL AND MANUFACTURING METHOD

BACKGROUND OF THE INVENTION

This invention relates to automobile wheels and particularly to wire spoke wheels which combine strength, ease of manufacture and beauty.

This invention relates particularly to wire spoke wheels having a center felly which is made in such manner that, after being fixed in a conventional rim, the resulting wheel can be used with conventional tubeless tires.

Wire spoke automobile wheels which permit the use of tubeless tires in a practical way are difficult and costly to make. In prior wire wheels the spoke ends at the wheel rim were mounted through holes in the drop center of the rim. This prevented a reliable airtight seal. Attempts to cover such spoke-rim assemblies with metal or elastomeric seal strips on the tire side of the rim have not been successful. Such wheels tend to develop leaks, and often require complete removal of the tire to adjust or replace a spoke.

In the truck and automobile fields, the rim is usually made from an imperforate sheet of metal rolled and welded into a circle of rim configuration, wherein only one hole for a valve stem was employed. Sealing this single hole against air leakage is a far simpler task than sealing many spoke tightening nipple holes. The advantages of a tubeless tire are well known.

SUMMARY OF THE INVENTION

A novel spoked wheel has been found which overcomes sealing problems by providing an inner felly which can be welded to the outer rim.

Accordingly, it is an object of the present invention to provide a metal spoked automotive wheel for tubeless tires having an outer circular rim with drop center adapted for receiving a tire, a tubular hub assembly having means for receiving wire spokes, a plurality of wire spokes extending radially outward from the hub with terminal threads adapted for mounting a felly with threaded spoke nipples, and including an improved narrow concentric inner felly of substantially uniform solid cross-section including predetermined spaced radial holes for receiving the spoke nipples and peripheral portions for engaging the outer rim drop center. It is a further object to provide a wire spoke assembly with the inner felly being integrally joined to the drop center of the outer rim at a peripheral portion.

Another object of the invention is to provide a novel manufacturing method for forming a wire wheel center adapted to be fixed in a rim for an automobile tubeless tire which includes forming an inner felly having peripheral portions adapted for engagement with a tubeless outer tire rim at a drop center portion; drilling the felly to provide radial spoke holes; forming a hub piece with a back flange and a front hub shell, and piercing and countersinking the back flange and front hub shell to provide hub spoke holes; positioning the inner felly and the hub piece concentrically with respect to each other; installing threaded wire spokes through the hub spoke holes of the hub piece and connecting said spokes with threaded spoke nipples inserted through the radial spoke holes in the felly; tightening the spoke nipples to a substantially uniform torque to provide a preliminary adjustment of lateral and radial run-out; machining the center periphery to a true radial run-out; and integrally joining the inner felly to the outer tire rim by welding the drop center to the felly.

These and other objects and features of the invention will be seen from the drawing and the description of the invention.

THE DRAWING

DESCRIPTION OF PREFERRED EMBODIMENTS

Figure 1:
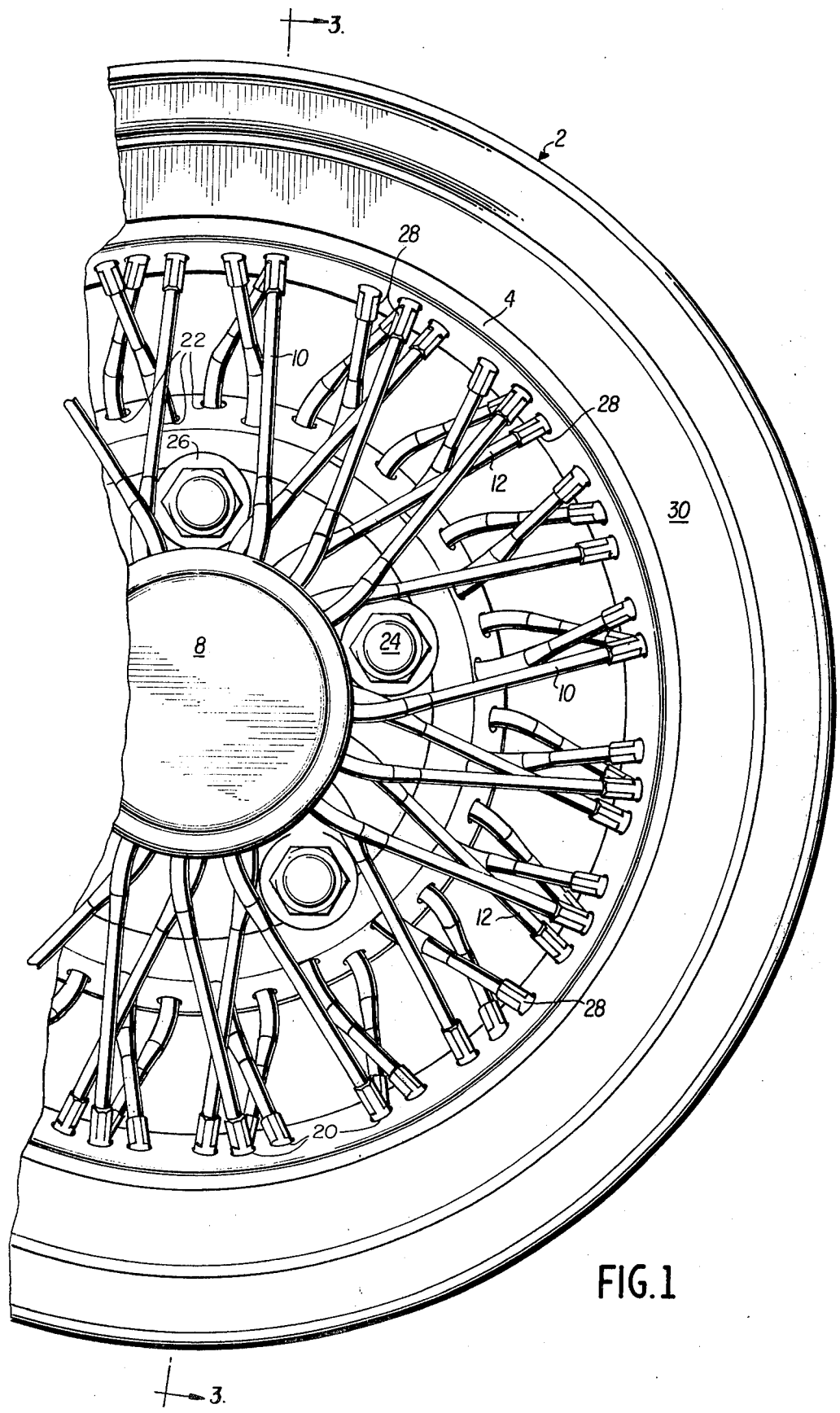
FIG. 1 is an elevational view showing the outer or front side of a wheel embodying the invention.

Referring now to FIG. 1, an outer tubeless-type tire rim is integrally joined to an inner felly 4. A tubular hub piece 6 is provided with a hub cap 8 covering the central hub shell. Four types of wire spokes connect the felly 4 to the hub assembly. Upper front spokes 10, lower front spokes 12, upper back spokes 14, and rear back spokes 16. Spokes are omitted in the lug bolt areas to facilitate ready mounting and dismounting of the wheel. As shown in FIG. 1, there are 70 spokes in all, although the number may vary according to design. The spokes are connected to the inner felly 4 through drilled radial spoke holes 20. The spokes are connected to the hub piece 6 by way of hub spoke holes 22. Although lug nuts do not form any part of this invention, the wire wheel has 5 lug nuts 24 depicted to show their position. Each lug nut may be accompanied by a lug bolt washer 26. The outer rim has a drop center 30. The drop center is conventional, and permits ready mounting of a tubeless tire onto the rim. An access port may be provided for mounting an automotive air-inflating valve, not shown.

Figure 2:
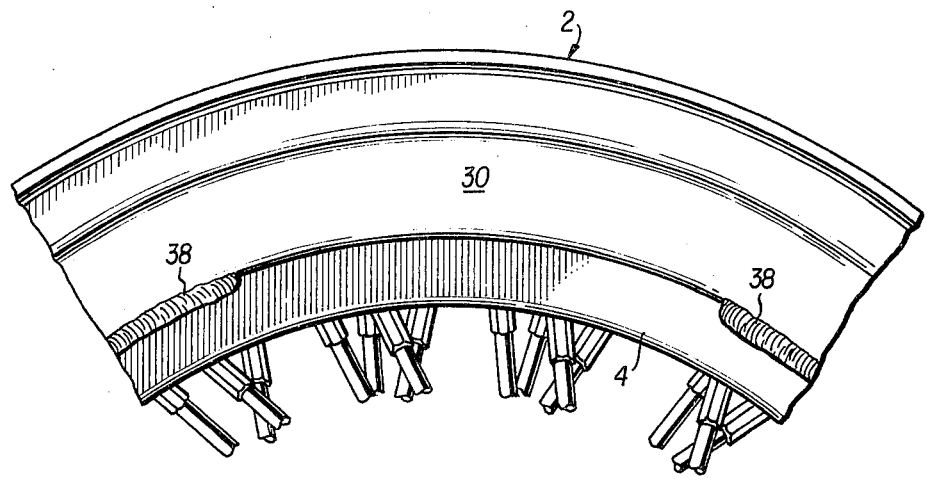
FIG. 2 is an elevational view of the inner or rear side of the wheel of FIG. 1.

FIG. 2 shows various of the aforementioned features of FIG. 1, and in addition shows band weld 38, which may be a partial or continuous bead extending around the inner peripheral surface of the felly. Three screws 44 retain the internal hub cap cup 40. At 46 is shown the hub mounting ring.

Figure 3A:
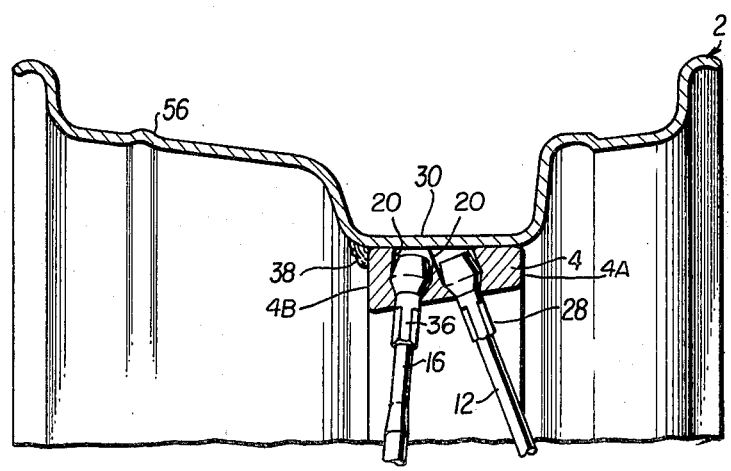
FIG. 3A is an enlarged cross-sectional view, as in FIG. 3, partially cut away to show structural details.
Figure 3:
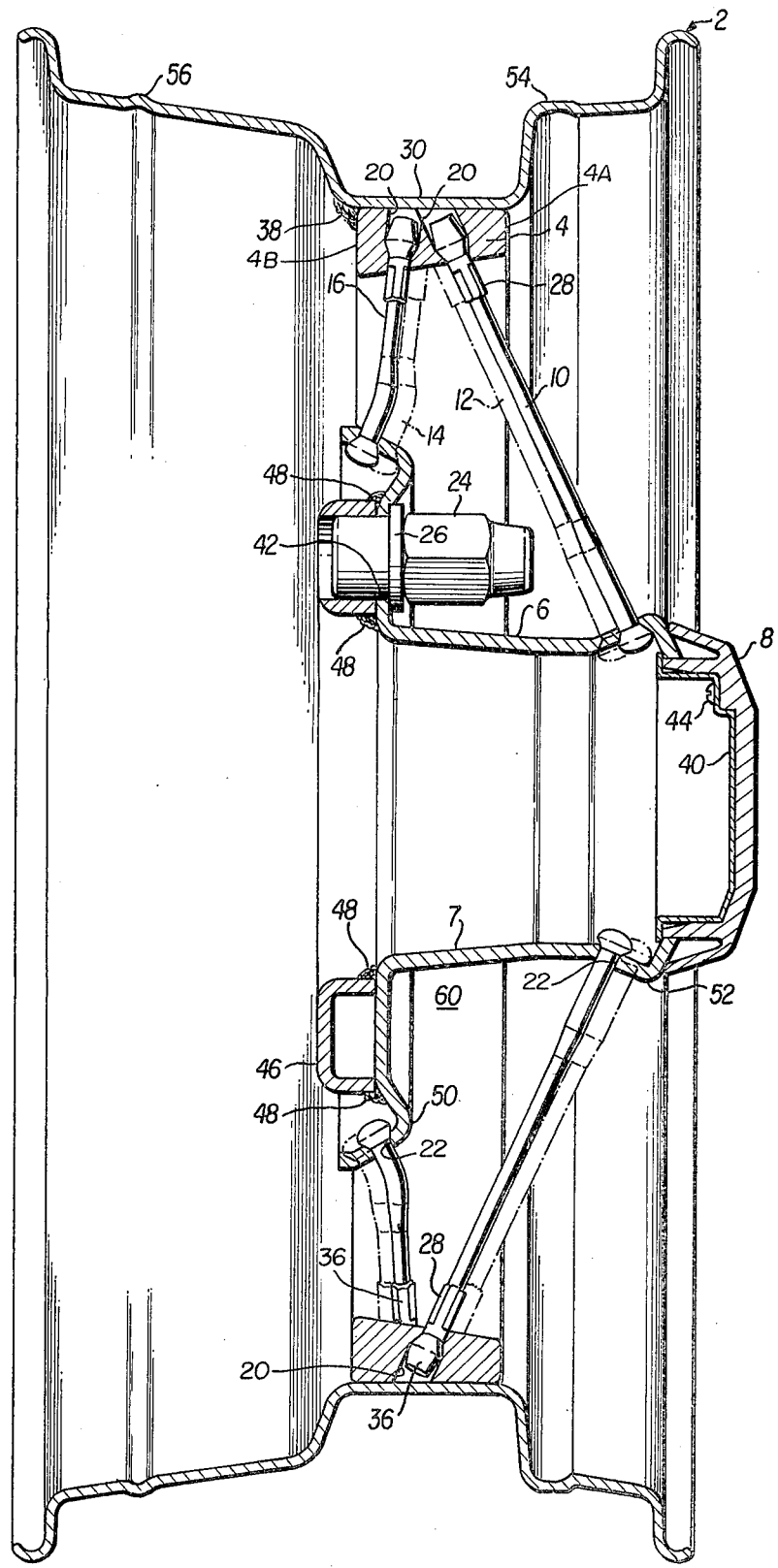
FIG. 3 is a cross-section view taken along line 3—3 of FIG. 1.

FIG. 3 shows the hub mounting ring weld bead 48, hub back flange 50, hub front flange 52, front tire bead seat 54, and rear tire bead seat 56. FIG. 3 is a cross-section of FIG. 1; however, to show the features with maximum clarity, some of the spokes have been omitted. The inner felly 4 has outer and inner annular surfaces peripheral 4A and 4B. The inner surface 4B is joined to the drop center by weld 38, which may be a continuous weld around the annular engaging surfaces or may comprise weld sections spaced apart.

The details of the inner felly are best understood from FIG. 3A, which is an enlarged fragement of FIG. 3, also along line 3—3 of FIG. 1. Nipple holes 20 are drilled at the predetermined desired spoke angles.

The felly element may be made by conventional manufacturing methods. For instance, a steel bar may be rolled to the desired felly cross-sectional configuration, cut, formed into a hoop and butt-welded.

The wire spoked wheel of this invention is made according to the manufacturing process set forth in copending U.S. patent application Ser. No. 519,096, filed Oct. 30, 1974, for a wire wheel, which disclosure is incorporated herein by reference.

The application is now abandoned, and its contents incorporated into a C.I.P. case Ser. No. 560,409, filed Mar. 20, 1975.

The hub piece 6 could be cast, fabricated, or otherwise made. The following stamping and drawing procedure however is preferred.

The preferred material used for the first draw operation is a piece of strip stock (hot rolled steel, pickled in oil), 0.168 inch thick. In the first forming operation, a sheet is formed into a so-called "hat blank", being a circular shape with a "hat" recess of about 1¼ inches, resembling a shallow pan. The center area is blanked out, i.e., punched or cut out, to obtain an inner hub piece having an outer diameter of about 8 inches. In this operation the hub section is simultaneously given a deep draw to provide a "proto" hub 5⅜ in diameter and 2¼ inches deep. In a second forming step the hub diameter is reduced to about 4 inches and it becomes deeper. In a third step the hub is given its final contours. The hub section is formed with the section profile as shown in FIG. 3. Several different forming operations may be used in achieving this profile.

After the large hat section is drawn, whereby the hub shell 7 is formed in basic outline, the steel is further drawn and refined in two subsequent operations, giving the shell in its final form with the bottom area of the hub blank still being substantially flat. The hub center is then blanked out (i.e., punched out). Then the hub shell is flared and lug holes 42 are pierced and coined. The front of the hub is given the reverse angle as shown in FIG. 3 to form the flange 52. While these forming operations are in progress, the back flange 50 is being developed. Three die operations may be used to form this flange. This completes the drawing and forming operations for the hub piece 6, and the inner hub spoke holes are drilled in it. The hub piece 6 is drilled in its front flange 52 to accommodate the front spokes and at its back flange 50 to receive the back spokes. The holes are 0.218 inches diameter and are countersunk (0.281 in. diameter, wide end) to facilitate seating the spoke feet as hereinafter described. All of these drilling and countersink operations can be done conveniently by hand. Or, the holes may be pierced and coined using automatic or semi-automatic equipment.

A hub mounting ring is drawn with an annular section, as shown at 46. A ring is blanked from strip stock, 7½ inch square, 0.140 inch thick. Then the ring is drawn into a recessed annulus having the cross-section shown, and simultaneously holes are pierced for the lug nuts. These operations can be done by hand or in a die press. The finished ring 46 is then welded to the rear of the hub piece 6 as shown in FIG. 3 The hub mounting ring has the function of providing additional support for the lugs. The hub piece 6 is then descaled to remove scale resulting from the welding operation, and then the front areas are polished.

The interior hub assembly includes hub, front and back flanges connected by front and back wire spokes to the spoke nipples, and a hub mounting ring affixed to the back of the hub assembly having means for mounting the hub assembly.

As shown in FIGS. 3 and 3a, the inner felly 4 is of substantially uniform solid cross-section, narrow, preferably having a width not greater than the drop center of the outer tubeless tire rim. The inner felly 4 is in the shape of a circular mounting band having a plurality of predetermined spaced radial drilled holes 20 to retain wire spoke nipples for rotational movement therein. The felly is drilled at the appropriate complex angle to receive and hold an enlarged portion of the wire spoke nipples during a subsequent assembly operation. The felly spoke holes 20 are 5/16 inches diameter. They are larger than the inner hub holes 22 because they must accommodate the spoke nipples 28.

After drilling, the felly element 4 is given another polishing to remove any die and scuff marks and may be electroplated if desired.

The spoke nipples are connected to the spokes with female threads for receiving the spoke threads and have an enlarged nipple mounting portion rotatably received within the felly holes to provide means for tightening the spokes.

The spokes and spoke nipples may be of conventional size and configuration and are available commercially. These spokes are swedged, with rolled threads. The spoke nipples may be headed to fit a Phillips screwdriver. Power screwdrivers with torque fittings may be used for assembly.

After the hub assembly 6 and the inner felly 4 are electroplated, they are assembled. The hub piece 6 and the inner felly 4 are fastened in a fixture, which holds each in the proper concentric fixed position with respect to the other. Back spokes 16 and 14 are then passed through the holes in the hub piece 6. Nipples 36 for back spokes are passed through the corresponding holes in the felly 4 and tightened up to a torque of about 5–10 inch pounds. Similar operations are then carried out for the front spokes. All of these operations can be done with simple hand tools. After the initial installation, each spoke is then further tightened to a torque of approximately 25–30 inch pounds. To obtain proper seating, the assembly is vibrated. This results in settling and leveling out burrs and other marks within the spoke holes. After this the spokes are tightened again, e.g., g., up to a torque of about 50–75 inch pounds. If the spokes have been assembled properly, the wheel center should now have a tolerance of less than 0.030 inches for lateral run-out, i.e., misalignment in a plane perpendicular to the center axis as well as for radial run-out, i.e., misalignment or eccentricity in the center axis.

The center assembly which is now semi-assembled, is placed in a truing apparatus and machined to a true radius. The truing apparatus can be a lathe or a milling machine or grinder. For this operation the center may be mounted by lug bolts to a fixture. At this point the inner felly 4 is slightly oversize, and it is machined to a true circle by removing material from the periphery to give an oversize of 0.010 inch for engaging the outer rim at the drop center. Such oversize will give a tight fit when the center is forced into the standard wheel rim. After the center is fitted into the rim (by automatic press or by hand alignment), it is checked and adjusted again for lateral run out. The spoke center assembly is welded to the outer rim, by hand, or preferably using a short arc semi-automatic welding machine. The inner felly is welded to the drop center along inner surface 4B, and may be joined to the drop center with a substantially continuous weld. The wheel is cleaned, then painted on the back side to cover the weld burn.

A hub cap 8 is mounted to help keep road grime out of the interior of the hub. This hub cap 8 can be readily detached by unscrewing three screws 44, thereby loosening the retaining cup 40. The retaining cup 40 can be removed then through the rear of the hub shell, thereby releasing the hub cap 8.

If the wheel is damaged in use and requires realignment, it can be realigned by the standard procedure used for all automobile spoke wheels, i.e., the spokes can be tightened or loosened with an open hand wrench.

What is claimed is:

1. In a metal spoked automotive wheel comprising a tubeless tire rim with a drop center, a hub having openings for receiving wire spokes, a plurality of wire spokes extending radially outward from the hub and having threads to cooperate with threaded spoke nipples; the improvement comprising a solid metal felly of substantially uniform solid cross-sectional configuration and comprising an inner annular surface and having nipple receiving holes formed therein at varying predetermined positions and angles for cooperation with the hub openings to mount the spokes therebetween, and means to integrally join said felly to the rim drop center.

2. The wheel of claim 1, said integral joining means comprising weld bead means joining said annular surface to said rim drop center.

3. The wheel of claim 1, said integral joining means comprising a substantially continuous weld bead joining said rim drop center to a radially disposed rear surface of said felly.

4. The wheel of claim 1, said integral joining means comprising a plurality of separate weld beads joining said rim drop center to a radially disposed rear annular surface of said felly.

5. The wheel of claim 1, wherein the felly is not axially wider than the drop center.

6. The wheel of claim 1, wherein the spoke nipples are connected to the spokes with female threads for receiving the spoke threads, and each have an enlarged niple portion rotatably received within the felly opening to permit adjustment of spoke tension.

7. The wheel of claim 1, wherein said nipple holes are drilled in said felly.

8. A method of forming an automotive wire wheel center comprising the steps of forming an inner solid felly of metal which is relatively thin radially and relatively narrow axially, drilling said felly to provide nipple holes at varying predetermined positions and angles therein, forming a hub piece having a back flange and a front hub shell, forming hub spoke holes in said back flange and in said front hub shell, said hub piece having an axial length substantially greater than that of said felly, positioning the inner felly and the hub piece concentrically with respect to each other, mounting spoke nipples in the felly nipple holes, installing threaded wire spokes through the hub spoke holes of the hub piece, connecting the spokes to the spoke nipples in the felly, tightening the spokes to a substantially uniform torque to provide a preliminary adjustment of lateral and radial run-out, and machining the center periphery to a true radial run-out.

9. The method of claim 8, wherein said hub spoke holes are formed by piercing and countersinking the back flange and the front hub shell.

10. The method of producing a tubeless tire wheel free of spoke holes in its rim, comprising the step of integrally joining the inner felly of the wheel center produced by the method of claim 8 to a tubeless tire rim by welding the rim drop center to said felly.

11. A wire spoke wheel center assembly adapted for mounting in a tubeless tire rim comprising an outer circular solid metal member of substantially uniform cross-sectional configuration and formed with a plurality of drilled holes at varying predetermined positions and angles to retain wire spoke nipples for rotational movement therein, and a hub assembly comprising a hub and front and back flanges connected by front and back wire spokes to said spoke nipples.

12. The center of claim 11, and said hub assembly also comprising a hub mounting rim affixed to the back of the hub assembly.

13. A vehicle wheel comprising a tire rim integrally joined to the wire spoke wheel center assembly of claim 11, said rim being formed with a single opening adapted to mount means to control the pneumatic inflation of a tire on said rim.

* * * * *